United States Patent
Kim

(10) Patent No.: US 11,938,999 B2
(45) Date of Patent: Mar. 26, 2024

(54) APPARATUS FOR CONTROLLING LANE KEEPING AND METHOD THEREOF

(71) Applicants: HYUNDAI MOTOR COMPANY, Seoul (KR); Kia Corporation, Seoul (KR)

(72) Inventor: Seung Hyun Kim, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 141 days.

(21) Appl. No.: 17/506,042

(22) Filed: Oct. 20, 2021

(65) Prior Publication Data

US 2022/0281524 A1 Sep. 8, 2022

(30) Foreign Application Priority Data

Mar. 2, 2021 (KR) ........................ 10-2021-0027642

(51) Int. Cl.
*B62D 15/02* (2006.01)
*B60W 30/12* (2020.01)

(52) U.S. Cl.
CPC ........... *B62D 15/025* (2013.01); *B60W 30/12* (2013.01)

(58) Field of Classification Search
CPC ..... B62D 15/025; B62D 6/003; B60W 30/12; B60W 2552/30
See application file for complete search history.

(56) References Cited

U.S. PATENT DOCUMENTS

| | | | | |
|---|---|---|---|---|
| 9,352,778 | B2* | 5/2016 | Yoon | B62D 15/025 |
| 2002/0052681 | A1* | 5/2002 | Matsuno | B60T 8/1755 |
| | | | | 701/80 |
| 2010/0066515 | A1* | 3/2010 | Shimazaki | H04N 7/18 |
| | | | | 701/41 |
| 2013/0190982 | A1* | 7/2013 | Nakano | B62D 15/025 |
| | | | | 701/41 |
| 2015/0329140 | A1* | 11/2015 | Tamaizumi | B62D 6/02 |
| | | | | 701/42 |
| 2018/0134290 | A1* | 5/2018 | Kataoka | B60W 30/12 |
| 2020/0023899 | A1* | 1/2020 | Takahashi | B62D 6/008 |

FOREIGN PATENT DOCUMENTS

KR 10-1846577 B1 4/2018

OTHER PUBLICATIONS

Hur, Hyunmoo & Shin, Yujeong & Ahn, Dahoon. (2020). Analysis on Steering Performance of Active Steering Bogie According to Steering Angle Control on Curved Section. Applied Sciences. 10. 4407. 10.3390/app10124407. (Year: 2020).*

* cited by examiner

*Primary Examiner* — Jaime Figueroa
*Assistant Examiner* — Jerrod Irvin Davis
(74) *Attorney, Agent, or Firm* — MORGAN, LEWIS & BOCKIUS LLP

(57) ABSTRACT

A lane keeping control apparatus, a vehicle system including the same, and a method thereof may include a processor configured to determine a target turning radius to reach a center portion of a lane, to determine a required steering angle based on the target turning radius, and to correct the required steering angle by use of a difference between an actual yaw rate and a target yaw rate during lane keeping control; and a storage configured to store data and algorithms driven by the processor.

17 Claims, 8 Drawing Sheets

<511>

<512>

APPARATUS FOR CONTROLLING LANE KEEPING AND METHOD THEREOF

CROSS-REFERENCE TO RELATED APPLICATION

The present application claims priority to Korean Patent Application No. 10-2021-0027642, filed on Mar. 2, 2021, the entire contents of which is incorporated herein for all purposes by this reference.

BACKGROUND OF THE INVENTION

Field of the Invention

The present invention relates to a lane keeping control apparatus, a vehicle system including the same, and a method thereof, and more particularly, to a lane keeping control technique based on yaw rate feedback.

Description of Related Art

Various systems for safe driving are applied to vehicles produced recently, or development for such application is underway, and one of them is a lane keeping control system that performs driving control to keep a lane by preventing lane departure when a vehicle leaves a lane due to driver's careless driving.

Such a lane keeping control system computes a target turning radius based on a geometry map to eliminate an error to a target path to calculate a required steering angle capable of following the target turning radius.

However, due to a difference between the geometric map and an actual map, it is difficult to follow the target turning radius during lane keeping control, thereby reducing reliability of the lane keeping control system. Particularly, in the case of a vehicle having a weight that changes in ton units, the required steering angle calculated by the geometry map and an actual required steering angle may be very different, resulting in more severe performance deterioration.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a lane keeping control apparatus, a vehicle system including the same, and a method thereof, configured for facilitating a vehicle to better follow a target turning radius by feeding back an error between a target yaw rate and a current yaw rate to correct a required steering angle when determining the required steering angle to follow the target turning radius based on a geometry map.

The technical objects of the present invention are not limited to the objects mentioned above, and other technical objects not mentioned may be clearly understood by those skilled in the art from the description of the claims.

Various aspects of the present invention are directed to providing a lane keeping control apparatus including: a processor configured to determine a target turning radius to reach a center portion of a lane, to determine a required steering angle based on the target turning radius, and to correct the required steering angle by use of a difference between an actual yaw rate and a target yaw rate during lane keeping control; and a storage configured to store data and algorithms driven by the processor.

In various exemplary embodiments of the present invention, the processor may determine the target turning radius by use of a distance error to the center portion of the lane on a gaze distance, received from a camera.

In various exemplary embodiments of the present invention, the processor may determine the required steering angle by dividing a vehicle wheel base value by the target turning radius.

In various exemplary embodiments of the present invention, the processor may determine the target yaw rate by use of the target turning radius and a vehicle speed.

In various exemplary embodiments of the present invention, the processor may determine a feedback required steering angle correction value by determining an error between the target yaw rate and a current yaw rate of the vehicle.

In various exemplary embodiments of the present invention, the processor may determine the feedback required steering angle correction value by multiplying the error between the target yaw rate and the current yaw rate of the vehicle by a predetermined correction factor.

In various exemplary embodiments of the present invention, the processor may correct the required steering angle by adding the feedback required steering angle correction value to the required steering angle.

Various aspects of the present invention are directed to providing a vehicle system including: a sensing device configured to acquire image data related to a front of a vehicle; and a lane keeping control apparatus configured to determine a target turning radius to reach a center portion of a lane based on a detecting result of the detecting device, to determine a required steering angle based on the target turning radius, and to correct the required steering angle by use of a difference between an actual yaw rate and a target yaw rate.

In various exemplary embodiments of the present invention, the lane keeping control apparatus may determine the target turning radius by use of a distance error to the center portion of the lane on a gaze distance, received from a camera.

In various exemplary embodiments of the present invention, the lane keeping control apparatus may determine the required steering angle by dividing a vehicle wheel base value by the target turning radius.

In various exemplary embodiments of the present invention, the lane keeping control apparatus may determine the target yaw rate by use of the target turning radius and a vehicle speed.

In various exemplary embodiments of the present invention, the lane keeping control apparatus may determine a feedback required steering angle correction value by determining an error between the target yaw rate and a current yaw rate of the vehicle.

In various exemplary embodiments of the present invention, the lane keeping control apparatus may determine the feedback required steering angle correction value by multiplying the error between the target yaw rate and the current yaw rate of the vehicle by a predetermined correction factor.

In various exemplary embodiments of the present invention, the lane keeping control apparatus may correct the required steering angle by adding the feedback required steering angle correction value to the required steering angle.

Various aspects of the present invention are directed to providing a lane keeping control method including: obtaining a lane central error distance based on image data related to a front of a vehicle during lane keeping control; determining a target turning radius for reaching a center portion of a lane based on the lane central error distance; determining a required steering angle based on the target turning radius; and correcting the required steering angle by use of a difference value between an actual yaw rate and a target yaw rate.

In various exemplary embodiments of the present invention, the obtaining of the lane central error distance may include obtaining a distance error to the center portion of the lane on a gaze distance, received from a camera.

In various exemplary embodiments of the present invention, the determining of the required steering angle may include determining the required steering angle by dividing a vehicle wheel base value by the target turning radius based on a geometry map.

In various exemplary embodiments of the present invention, it may further include determining the target yaw rate by use of the target turning radius and a vehicle speed.

In various exemplary embodiments of the present invention, the correcting of the required steering angle may include determining a feedback required steering angle correction value by determining an error between the target yaw rate and a current yaw rate of the vehicle.

In various exemplary embodiments of the present invention, the correcting of the required steering angle may include correcting the required steering angle by adding the feedback required steering angle correction value to the required steering angle.

According to the present technique, it is possible to enable a vehicle to better follow a target turning radius by feeding back an error between a target yaw rate and a current yaw rate to correct a required steering angle when determining the required steering angle to follow the target turning radius based on a geometry map.

Furthermore, various effects which may be directly or indirectly identified through the present specification may be provided.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
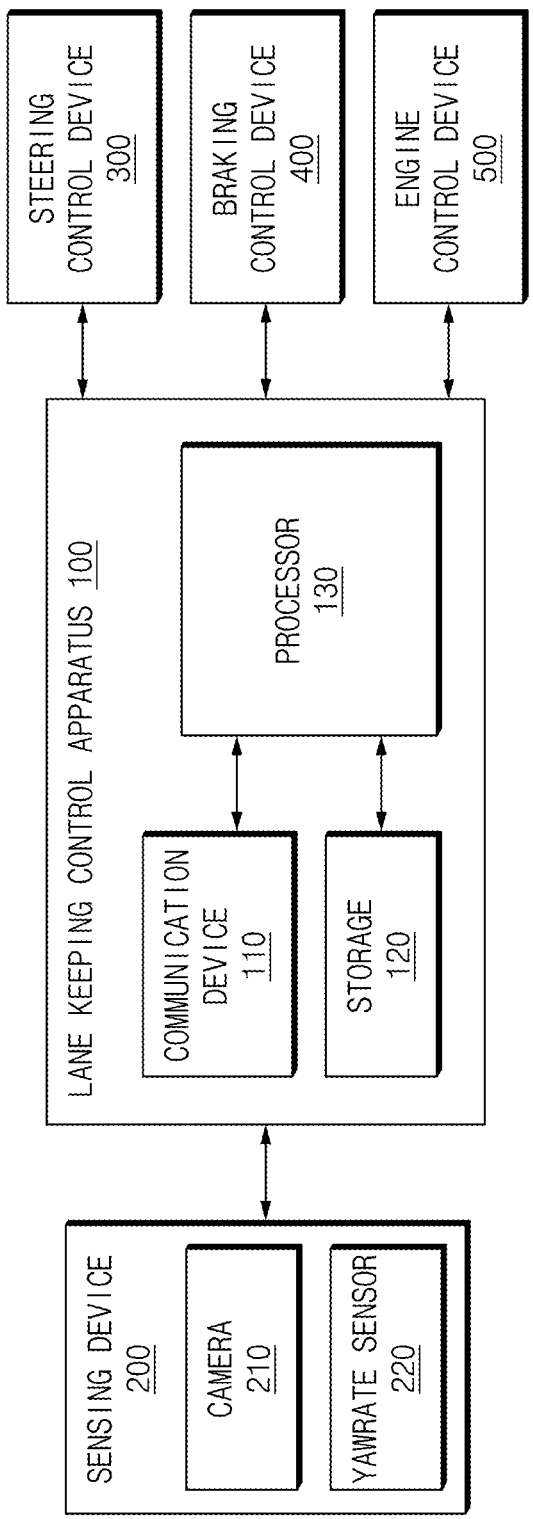
FIG. 1 illustrates a block diagram showing a configuration of a vehicle system including a lane keeping control apparatus according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and portion shapes will be determined in part by the particular intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, some exemplary embodiments of the present invention will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present invention, when it is determined that detailed descriptions of related well-known configurations or functions interfere with understanding of the exemplary embodiments of the present invention, the detailed descriptions thereof will be omitted.

In describing constituent elements according to various exemplary embodiments of the present invention, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which various exemplary embodiments of the present invention pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present invention will be described in detail with reference to FIG. 1 to FIG. 6.

FIG. 1 illustrates a block diagram showing a configuration of a vehicle system including a lane keeping control apparatus according to various exemplary embodiments of the present invention.

Referring to FIG. 1, the vehicle system according to the exemplary embodiment of the present invention may include a lane keeping control apparatus 100, a sensing device 200, a steering control device 300, a braking control device 400, and an engine control unit (ECU) 500.

The lane keeping control apparatus 100 according to the exemplary embodiment of the present invention may be implemented inside the vehicle. In the instant case, the lane keeping control apparatus 100 may be integrally formed with internal control units of the vehicle, or may be implemented as a separate device to be connected to control units of the vehicle by a separate connection means. The lane keeping control apparatus 100 may be implemented as a lane following assist (LFA), a lane departure warning (LDW), a lane keeping system (LKS), and a lane keeping assistance device system (LKAS), etc.

During lane keeping control, the lane keeping control apparatus 100 may determine a target turning radius for reaching a center portion of the lane, and may determine a required steering angle based on the target turning radius. Furthermore, the lane keeping control apparatus 100 may correct the required steering angle by determining a feedback required steering angle correction value for correcting a required steering angle using a difference value between an actual yaw rate and a target yaw rate.

The lane keeping control apparatus 100 may include a communication device 110, a storage 120, and a processor 130.

The communication device 110 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, Local Interconnect Network (LIN) communication, flex-ray communication, and the like.

As an example, the communication device 110 may communicate with in-vehicle devices, and may receive a detecting result from the sensing device 200. The communication device 110 may receive a distance error from a camera 210 to a center portion of a vehicle on a gaze distance.

The storage 120 may store sensing results of the sensing device 200 and data and/or algorithms required for the processor 130 to operate, and the like. For example, the storage 120 may store the target rotation radius, the required steering angle, the feedback required steering angle correction value, and the like determined by the processor 130.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 130 may be electrically connected to the communication device 110, the storage 120, and the like, may electrically control each component, and may be an electrical circuit that executes software commands, performing various data processing and determinations described below.

The processor 130 may process signals transferred between constituent elements of the lane keeping control apparatus 100. The processor 130 may be, e.g., an electronic control unit (ECU), a micro controller unit (MCU), or other subcontrollers mounted in the vehicle.

The processor 130 obtains the target turning radius as shown in Equation 1 through a lane central distance error $y_{error}$ on a gazing distance x received from the camera 210.

$$R_d = \left( \frac{2 y_{error}}{x^2 + y_{error}^2} \right) \quad \text{(Equation 1)}$$

Figure 2:
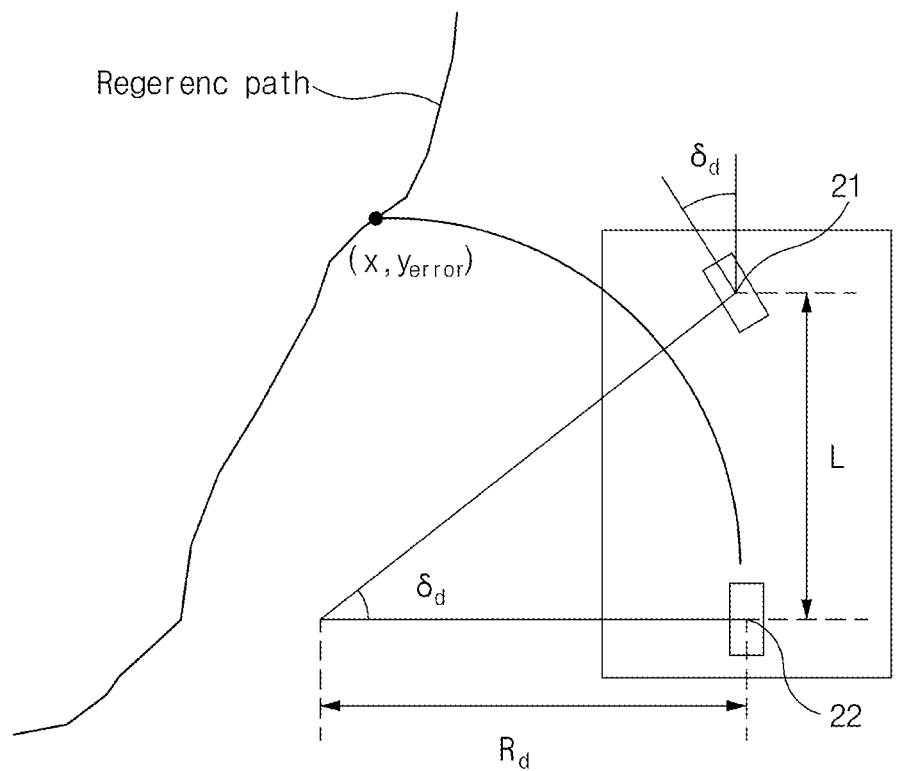
FIG. 2 illustrates a view for describing a process of determining a target turning radius based on a geometry map of a lane keeping control apparatus according to various exemplary embodiments of the present invention.

Herein, $R_d$ indicates the target turning radius, $y_{error}$ indicates the lane central distance error, and x indicates the gazing distance. FIG. 2 illustrates a view for describing a process of determining a target turning radius based on a geometry map of a lane keeping control apparatus according to various exemplary embodiments of the present invention. As illustrated in FIG. 2, the target turning radius represents a turning radius for the vehicle to reach the center portion of the lane.

The processor 130 generates the required steering angle for achieving the target turning radius based on a feedforward method using a geometry map.

$$\delta_d = \left( \frac{L}{R_d} \right) \quad \text{(Equation 2)}$$

Herein, $\delta_d$ indicates the required steering angle, $R_d$ indicates the target turning radius, and L indicates a distance between a front wheel 21 and a rear wheel 22 of the vehicle illustrated in FIG. 2 as a wheel base value of the vehicle.

As described above, the processor 130 may determine the required steering angle using a pure pursuit geometry, and may determine the required steering angle by dividing the wheelbase value L by the target turning radius $R_d$ of the vehicle as shown in Equation 2.

The processor 130 changes the target turning radius of the vehicle to the target yaw rate to determine a degree of following the target turning radius of the current vehicle.

$$\dot{\psi}_d = \left( \frac{V}{R_d} \right) \quad \text{(Equation 3)}$$

Equation 3 is a value established through vehicle dynamics, where V indicates a speed and $R_d$ indicates the target turning radius value.

This is to determine whether the actual yaw rate is well followed by changing the target turning radius to the target yaw rate because the actual turning radius of the vehicle can be measured through the yaw rate sensor.

The processor 130 determines an error ($\dot{\psi}_d - \dot{\psi}$) between the target yaw rate $\dot{\psi}_d$ and the actual yaw rate $\dot{\psi}$, and generates a feedback required steering angle correction value $K(\dot{\psi}_d - \dot{\psi})$ by use of the error and a correction coefficient K.

The processor 130 corrects the required steering angle by adding the feedback required steering angle correction value $K(\dot{\psi}_d - \dot{\psi})$ to the required steering angle determined through Equation 2. That is, the processor 130 may determine a final corrected required steering angle $\delta_{d\_co}$) as illustrated in Equation 4.

$$\delta_{d\_co} = \left( \frac{L}{R_d} \right) + K(\dot{\psi}_d - \dot{\psi}) \quad \text{(Equation 4)}$$

K is a correction coefficient, and is a tuning parameter.

Accordingly, the processor 130 may determine the final corrected required steering angle by adding the required steering angle based on the yaw rate feedback to the required steering angle based on the feedforward, making it easy to follow target turning radius and improving system performance.

The sensing device 200 may include a camera 210 for acquiring lane information and a yaw rate sensor 220 for detecting a yaw rate of a vehicle. In the instant case, the camera 210 may photograph a front of the vehicle to obtain the lane information.

The steering control device 300 may be configured to control a steering angle of a vehicle, and may include a steering wheel, an actuator interlocked with the steering wheel, and a controller configured for controlling the actuator.

The braking control device 400 may be configured to control braking of the vehicle, and may include a controller that is configured to control a brake thereof.

The engine control unit (ECU) 500 may be configured to control engine driving of a vehicle, and may include a controller that is configured to control a speed of the vehicle.

Figure 3:
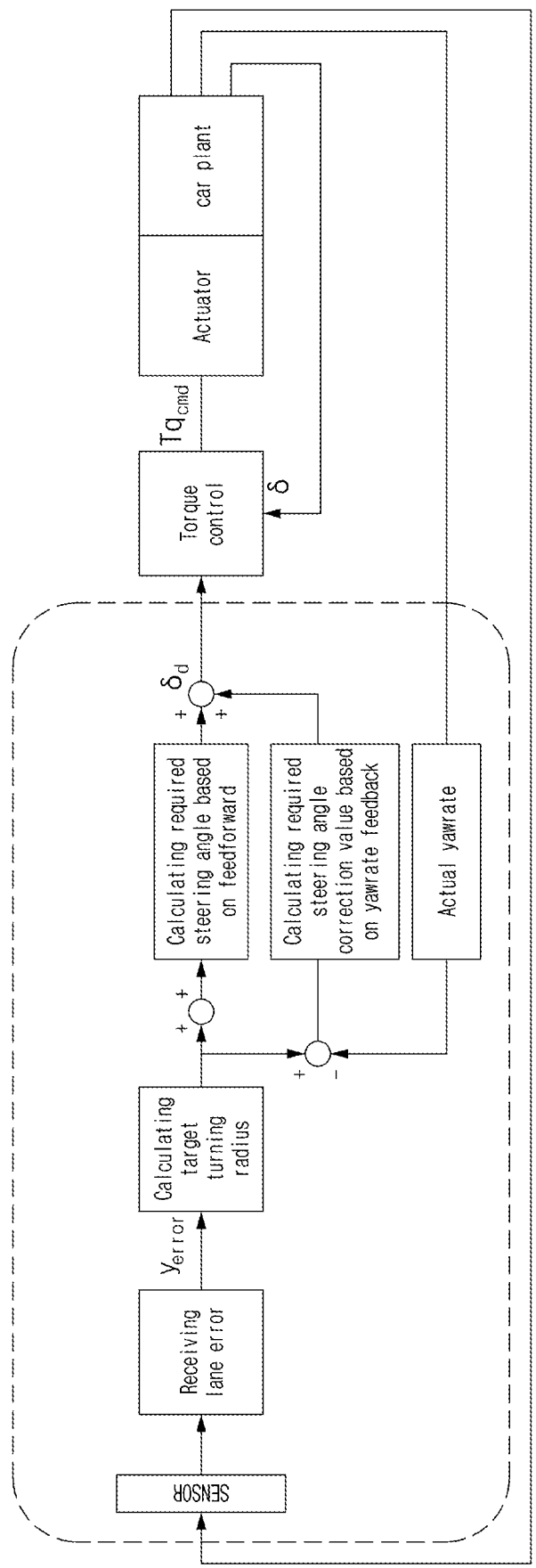
FIG. 3 illustrates a lane keeping control method according to various exemplary embodiments of the present invention.

FIG. 3 illustrates a lane keeping control method according to various exemplary embodiments of the present invention.

Referring to FIG. 3, the lane keeping control apparatus 100 receives a lane central distance error $y_{error}$ from the sensing device 200, determines the target turning radius using the lane central distance error $y_{error}$, and determines the required steering angle based on the feedforward by use of the target turning radius. Meanwhile, the lane keeping control apparatus 100 may determine a required steering angle correction value which is a difference between the actual yaw rate and the target yaw rate, and may determine a final required steering angle by reflecting the required steering angle correction value to the required steering angle based on the feedforward. Accordingly, the lane keeping control apparatus 100 may control steering of the vehicle depending on the corrected final required steering angle.

Figure 4:
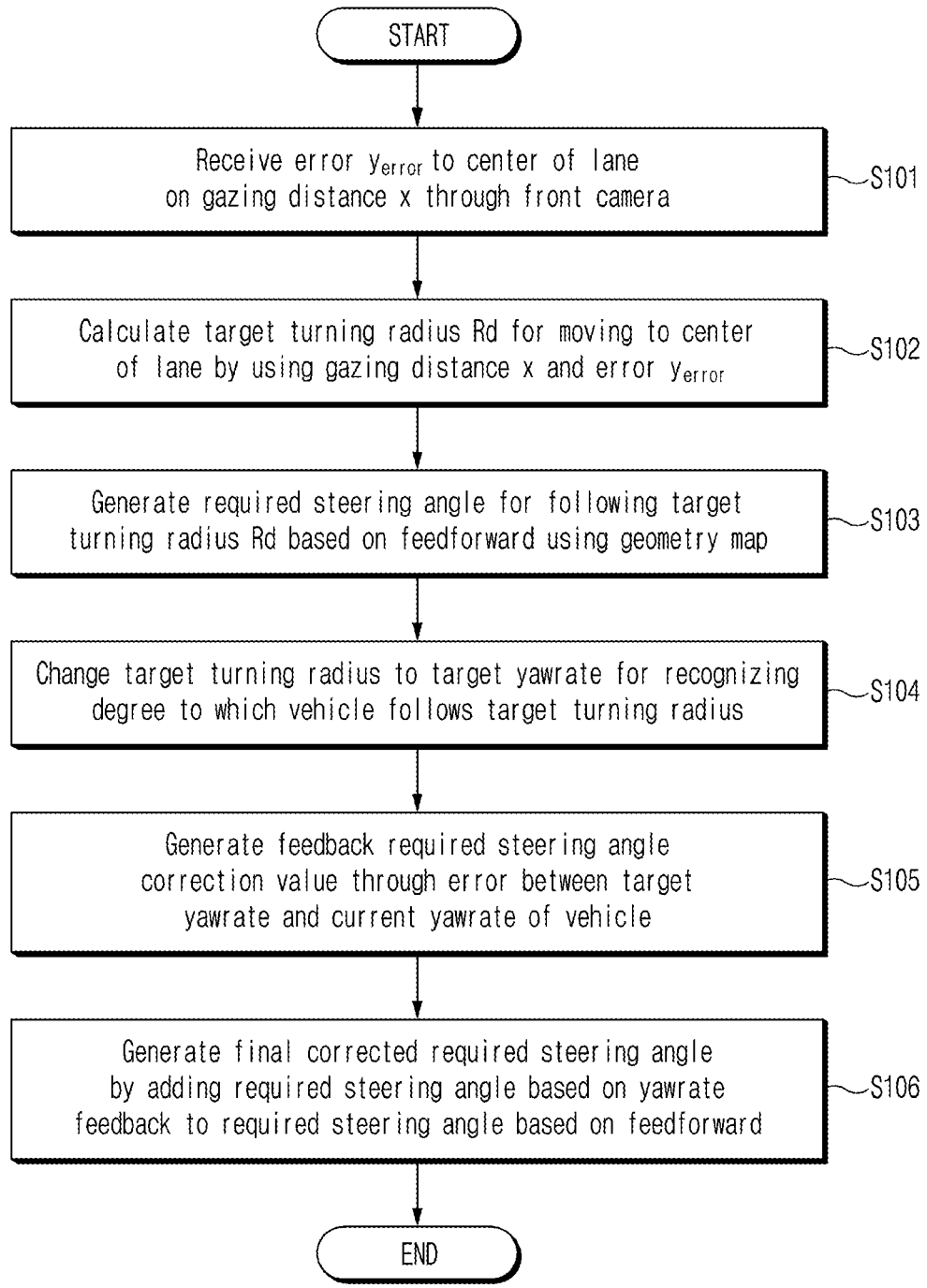
FIG. 4 illustrates a flowchart for describing a lane keeping control method based on yaw rate feedback according to various exemplary embodiments of the present invention.

Hereinafter, a lane keeping control method according to various exemplary embodiments of the present invention will be described in detail with reference to FIG. 4. FIG. 4 illustrates a flowchart for describing a lane keeping control method based on yaw rate feedback according to various exemplary embodiments of the present invention.

Hereinafter, it is assumed that the lane keeping control apparatus 100 of the of FIG. 1 performs processes of FIG. 4. Furthermore, in the description of FIG. 4, operations referred to as being performed by a device may be understood as being controlled by the processor 130 of the lane keeping control apparatus 100.

Referring to FIG. 4, the lane keeping control apparatus 100 receives the lane central distance error $y_{error}$ to a center portion of a lane on the gazing distance x from the camera 210, and determines a target turning radius for the vehicle to reach the center portion of the lane by use of the lane central distance error $y_{error}$ from the gaze distance x (S102).

The lane keeping control apparatus 100 generates a required steering angle for following a target turning radius based on a feedforward method using a geometry map as illustrated in FIG. 2 (S103). In the instant case, the lane keeping control apparatus 100 may determine the required steering angle by dividing the wheelbase value L of the vehicle by the target turning radius $R_d$.

Subsequently, the lane keeping control apparatus 100 determines the target yaw rate $\psi_d$ by use of the target turning radius of the vehicle to determine a degree to which the vehicle currently follows the target turning radius (S104). That is, the lane keeping control apparatus 100 may change the target turning radius to the target yaw rate, and may determine the target yaw rate by dividing the vehicle speed by the target turning radius.

Next, the lane keeping control apparatus 100 determines an error ($\dot\psi_d - \dot\psi$) between the target yaw rate and the actual yaw rate $\dot\psi$, and generates a feedback required steering angle correction value $K(\dot\psi_d - \dot\psi)$ by use of the error and a correction coefficient K (S105).

The lane keeping control apparatus 100 corrects the required steering angle by adding the feedback required steering angle correction value $K(\dot\psi_d - \dot\psi)$ to the required steering angle determined through Equation 2 (S106). That is, the lane keeping control apparatus 100 may determine a final corrected required steering angle $\delta_{d\_co}$ by adding the required steering angle based on the feedforward and the required steering angle based on the yaw rate feedback.

Accordingly, the lane keeping control apparatus 100 may determine the final corrected required steering angle by adding the required steering angle based on the yaw rate feedback to the required steering angle based on the feedforward, making it easy to follow target turning radius and improving system performance.

Figure 5A:
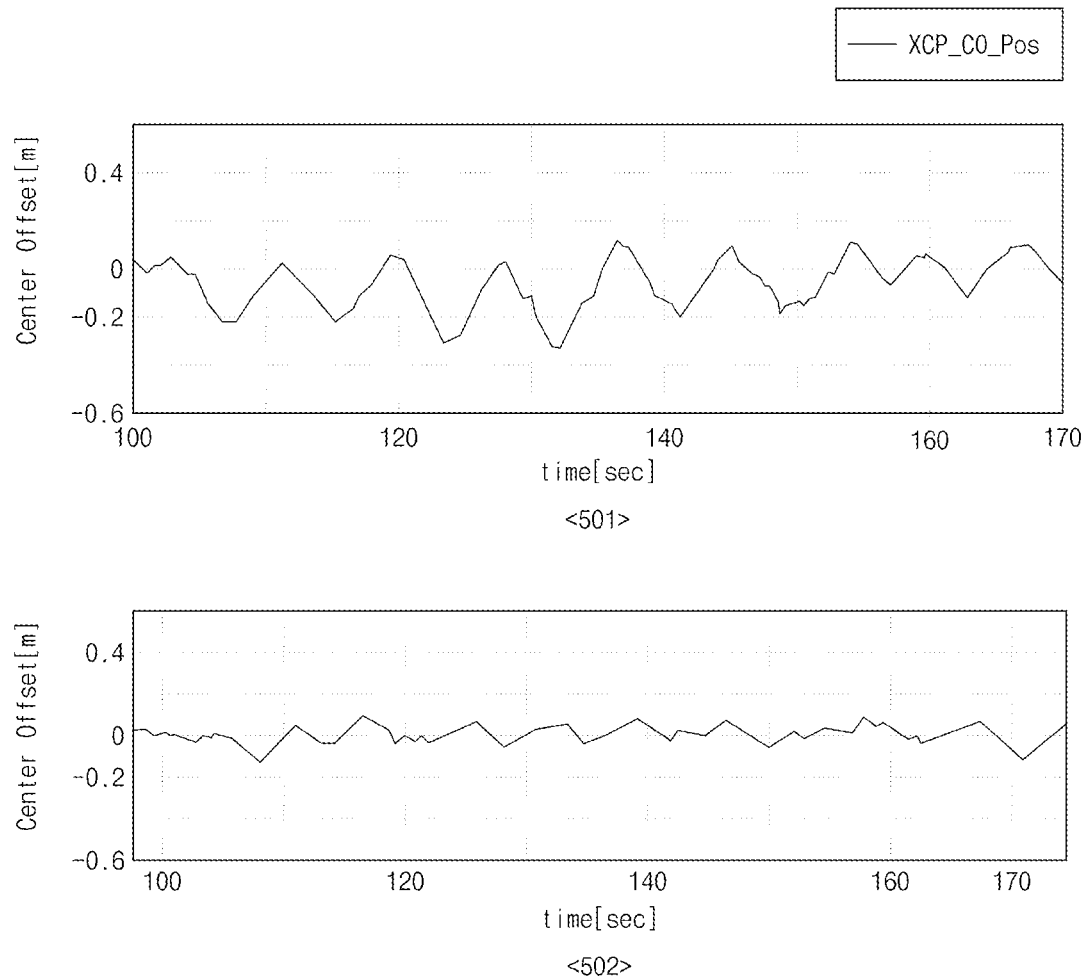
FIG. 5A, FIG. 5B and FIG. 5C illustrate views for describing a lane keeping control effect based on yaw rate feedback according to various exemplary embodiments of the present invention.
Figure 5B:
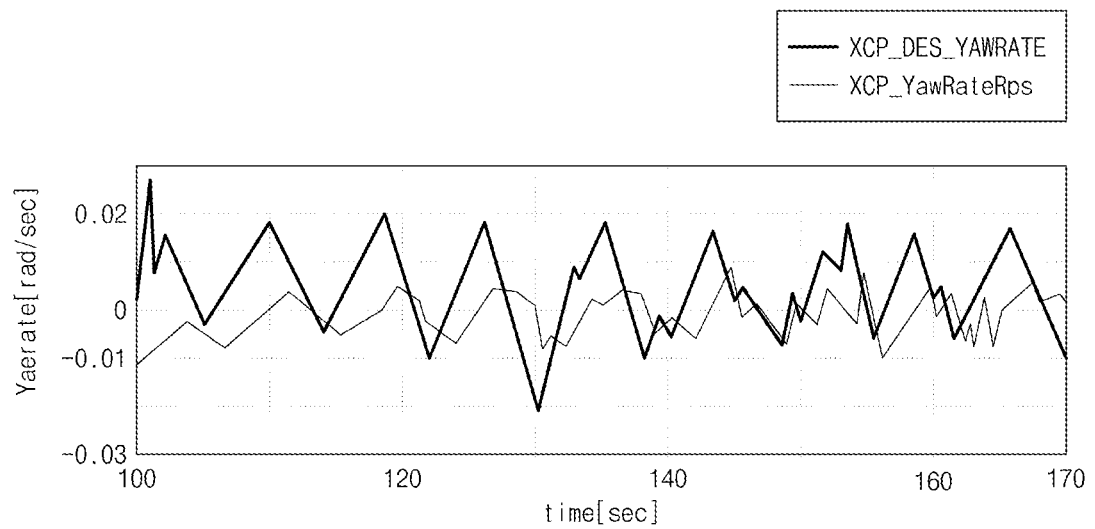
Figure 5B:
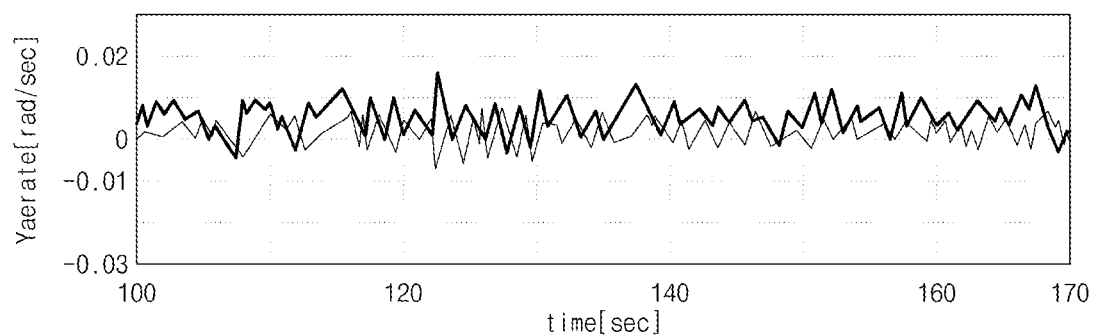
Figure 5C:
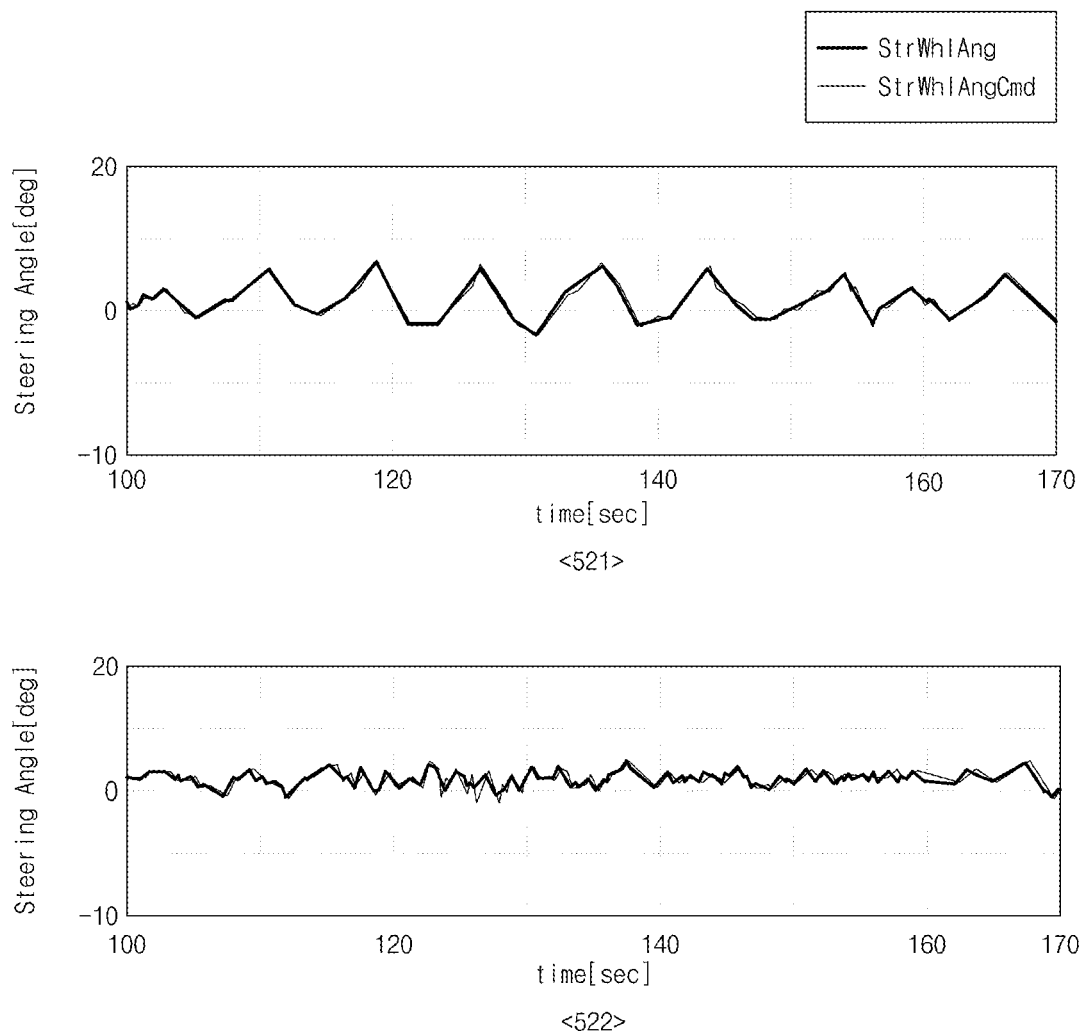

FIG. 5A, FIG. 5B and FIG. 5C illustrate views for describing a lane keeping control effect based on yaw rate feedback according to various exemplary embodiments of the present invention. FIG. 5A, FIG. 5B and FIG. 5C illustrate an effect difference between a conventional method of determining the required steering angle based on the feedforward without the yaw rate feedback and the method of the present invention reflecting the required steering angle based on the yaw rate feedback to the required steering angle based on the feedforward.

Referring to FIG. 5A, it may be seen that an error 502 to the center portion of the lane according to various exemplary embodiments of the present invention is significantly smaller than an error 501 to the center portion of the lane according to the conventional method.

Also referring to FIG. 5B, it may be seen that a difference value 512 between the target yaw rate and the actual yaw rate according to various exemplary embodiments of the present invention is significantly smaller than a difference value 511 between the target yaw rate and the actual yaw rate according to the existing method.

Furthermore, referring to FIG. 5C, it may be seen that a steering change value 522 according to various exemplary embodiments of the present invention is significantly smaller than a steering change value 521 according to the conventional method.

As shown in Table 1, it may be seen that a path offset and a target yaw rate error are improved by adding the yaw rate feedback control.

TABLE 1

| Division | Based on feedforward (existing) | When adding yaw rate feedback (present invention) | Improved |
|---|---|---|---|
| Path offset oscillation | 0.6 [m] | 0.2 [m] | 66% |
| Target yaw rate error | 0.02 [rad/s] | 0.01 [rad/s] | 50% |

Accordingly, according to various exemplary embodiments of the present invention, reliability of the lane keeping control may be increased compared to the related art in which feedback related to whether or not the required steering angle is actually followed has not been made, by determining the required steering angle based on the geometry map and correcting the required steering angle based on the yaw rate feedback, that is, by continuously feedbacking the error, and correcting and reflecting the required steering angle, when the actual turning radius is different from the target turning radius.

Figure 6:
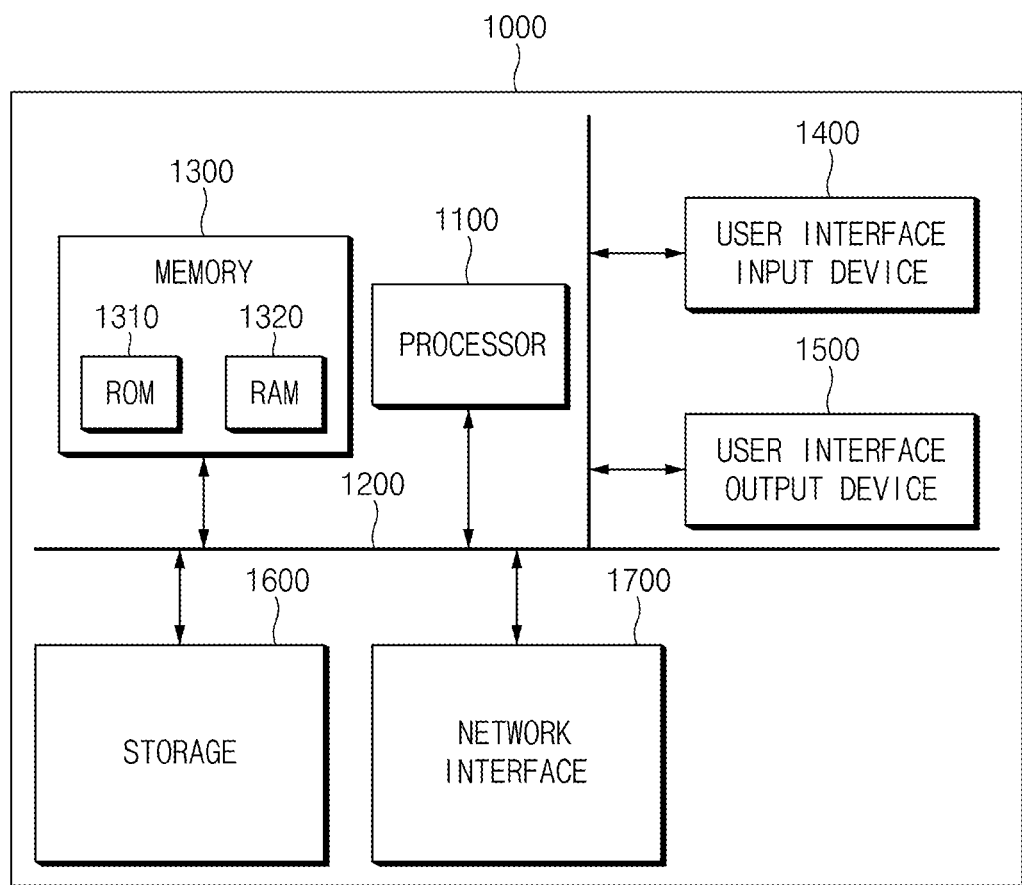
FIG. 6 illustrates a computing system according to various exemplary embodiments of the present invention.

FIG. 6 illustrates a computing system according to various exemplary embodiments of the present invention.

Referring to FIG. 6, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present invention, and those skilled in the art to which various exemplary embodiments of the present invention pertains may make various modifications and variations without departing from the essential characteristics of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A lane keeping control apparatus comprising:
   a processor configured to determine a target turning radius based on a geometry map to reach a center portion of a lane, to determine a required steering angle of a vehicle based on the target turning radius, and to correct the required steering angle of the vehicle by use of a difference between an actual yaw rate and a target yaw rate during lane keeping control to control the vehicle to follow the target turning radius; and
   a storage configured to store data and algorithms driven by the processor,
   wherein the processor is configured to determine the target yaw rate by only use of the target turning radius and a vehicle speed and to perform a Lane keeping assist (LKA).

2. The lane keeping control apparatus of claim 1, wherein the processor is configured to determine the target turning radius using a distance error to the center portion of the lane on a gaze distance, received from a camera.

3. The lane keeping control apparatus of claim 1, wherein the processor is configured to determine the required steering angle by dividing a vehicle wheel base value by the target turning radius.

4. The lane keeping control apparatus of claim 1, wherein the processor is configured to determine a feedback required steering angle correction value by determining an error between the target yaw rate and a current yaw rate of the vehicle.

5. The lane keeping control apparatus of claim 4, wherein the processor is configured to determine the feedback required steering angle correction value by multiplying the error between the target yaw rate and the current yaw rate of the vehicle by a predetermined correction factor.

6. The lane keeping control apparatus of claim 4, wherein the processor is configured to correct the required steering angle by adding the feedback required steering angle correction value to the required steering angle.

7. A vehicle system comprising:
   a sensing device configured to acquire image data related to a front of a vehicle; and
   a lane keeping control apparatus configured to determine a target turning radius based on a geometry map to reach a center portion of a lane based on a detecting result of the sensing device, to determine a required steering angle of the vehicle based on the target turning radius, and to correct the required steering angle by use of a difference between an actual yaw rate and a target yaw rate to control the vehicle to follow the target turning radius,
   wherein the lane keeping control apparatus is configured to determine the target yaw rate by only use of the target turning radius and a vehicle speed and to perform a Lane keeping assist (LKA).

8. The vehicle system of claim 7, wherein the lane keeping control apparatus is configured to determine the target turning radius by use of a distance error to the center portion of the lane on a gaze distance, received from a camera.

9. The vehicle system of claim 7, wherein the lane keeping control apparatus is configured to determine the required steering angle by dividing a vehicle wheel base value by the target turning radius.

10. The vehicle system of claim 7, wherein the lane keeping control apparatus is configured to determine a feedback required steering angle correction value by determining an error between the target yaw rate and a current yaw rate of the vehicle.

11. The vehicle system of claim 10, wherein the lane keeping control apparatus is configured to determine the feedback required steering angle correction value by multiplying the error between the target yaw rate and the current yaw rate of the vehicle by a predetermined correction factor.

12. The vehicle system of claim 10, wherein the lane keeping control apparatus is configured to correct the required steering angle by adding the feedback required steering angle correction value to the required steering angle.

13. A lane keeping control method comprising:

obtaining a lane central error distance based on image data related to a front of a vehicle during lane keeping control;

determining a target turning radius based on a geometry map for reaching a center portion of a lane based on the lane central error distance;

determining a required steering angle of the vehicle based on the target turning radius;

correcting the required steering angle by use of a difference value between an actual yaw rate and a target yaw rate to control the vehicle to follow the target turning radius; and determining the target yaw rate by only use of the target turning radius and a vehicle speed; and performing a Lane keeping assist (LKA).

14. The lane keeping control method of claim 13, wherein the obtaining of the lane central error distance includes obtaining a distance error to the center portion of the lane on a gaze distance, received from a camera.

15. The lane keeping control method of claim 13, wherein the determining of the required steering angle, includes determining the required steering angle by dividing a vehicle wheel base value by the target turning radius based on the geometry map.

16. The lane keeping control method of claim 13, wherein the correcting of the required steering angle includes determining a feedback required steering angle correction value by determining an error between the target yaw rate and a current yaw rate of the vehicle.

17. The lane keeping control method of claim 16, wherein the correcting of the required steering angle includes correcting the required steering angle by adding the feedback required steering angle correction value to the required steering angle.

* * * * *